United States Patent
Wright

(10) Patent No.: US 12,282,087 B1
(45) Date of Patent: Apr. 22, 2025

(54) SYSTEMS AND METHODS FOR WEAPON DETECTION

(71) Applicant: PerVista, Inc., Oxon Hill, MD (US)

(72) Inventor: Vennard Wright, Clinton, MD (US)

(73) Assignee: PERVISTA, INC., Oxon Hill, MD (US)

( * ) Notice: Subject to any disclaimer, the term of this patent is extended or adjusted under 35 U.S.C. 154(b) by 0 days.

(21) Appl. No.: 18/824,466

(22) Filed: Sep. 4, 2024

(51) Int. Cl.
*G01S 13/88* (2006.01)
*G01S 7/41* (2006.01)
*G01S 13/86* (2006.01)

(52) U.S. Cl.
CPC ............ *G01S 13/887* (2013.01); *G01S 7/417* (2013.01); *G01S 13/865* (2013.01)

(58) Field of Classification Search
CPC ........ G01S 13/867; G01S 13/86; G01S 13/87; G01S 17/86; G01S 13/865; G01S 13/862; G01S 15/86; G01S 7/417; G01S 7/411; G01S 13/887; G01S 7/415
See application file for complete search history.

(56) References Cited

U.S. PATENT DOCUMENTS

| | | | |
|---|---|---|---|
| 2020/0103499 A1* | 4/2020 | Preece | G06N 3/04 |
| 2021/0271922 A1* | 9/2021 | Chen | G01S 13/886 |
| 2022/0214446 A1* | 7/2022 | Graham | G01S 13/87 |
| 2022/0334243 A1* | 10/2022 | DeAngelus | G06V 10/454 |
| 2023/0324542 A1* | 10/2023 | Peterson | G01S 13/89 342/176 |
| 2023/0394938 A1* | 12/2023 | Abdel-Mottaleb | H04N 7/183 |
| 2024/0383479 A1* | 11/2024 | Awathe | B60W 30/18163 |
| 2024/0386597 A1* | 11/2024 | Sathianathan | G01S 13/867 |

\* cited by examiner

*Primary Examiner* — Olumide Ajibade Akonai
(74) *Attorney, Agent, or Firm* — George Likourezos; Carter, DeLuca & Farrell LLP

(57) ABSTRACT

A system for detecting a potential threat includes a processor and a memory coupled to the processor. The memory has instructions stored thereon, which when executed by the processor, cause the system to access a first signal from a first sensor system, the first signal including an optical signal, an infrared signal, a radio detection and ranging (RADAR) signal, or a light detection and ranging (LIDAR) signal; generate a first fused signal stream, using sensor fusion, based on the first signal; provide a confidence level of a potential threat, based on the first fused signal stream, using an anomalous behavior model; determine that the provided confidence level of the potential threat exceeds a predetermined threshold; and output an alert indicating a condition of the potential threat.

20 Claims, 10 Drawing Sheets

SYSTEMS AND METHODS FOR WEAPON DETECTION

TECHNICAL FIELD

The present application relates to systems and methods for weapon detection, and, more specifically, to a system and method which utilize artificial intelligence for automatically detecting multiple categories of weapons.

BACKGROUND

Modern surveillance, including weapons detection systems, offer enhanced security in the digital age. However, privacy concerns, high operations costs, and frequent system maintenance present challenges to providing accurate results in real-time. Moreover, many systems provide limited weapons detection capabilities, which often incorrectly identify harmless objects as threats. This can lead to unnecessary alarm, disruption, and potential harassment of innocent individuals. Conversely, the systems may fail to detect actual threats, providing a false sense of security and potentially allowing dangerous situations to escalate.

Accordingly, there is a need for an improved weapons detection system, which is able to provide reliable results in real-time.

SUMMARY

In accordance with an aspect of the present disclosure, a system for detecting a potential threat includes a processor and a memory coupled to the processor. The memory has instructions stored thereon, which when executed by the processor, cause the system to access a first signal from a first sensor system, the first signal including an optical signal, an infrared signal, a radio detection and ranging (RADAR) signal, or a light detection and ranging (LIDAR) signal; generate a first fused signal stream, using sensor fusion, based on the first signal; provide a confidence level of a potential threat, based on the first fused signal stream, using an anomalous behavior model; determine that the confidence level of the provided confidence level of the potential threat exceeds a predetermined threshold; and output an alert indicating a condition of the potential threat.

In an aspect of the present disclosure, the potential threat may include an individual having at least one of a firearm, a knife, or an explosive device.

In another aspect of the present disclosure, providing the confidence level of the potential threat may include identifying an anomalous behavior of the individual. The anomalous behavior may include patting, staring, and/or wandering by the individual.

In yet another aspect of the present disclosure, the instructions, when executed by the processor, may further cause the system to activate a second sensor system configured to detect a second signal, based on the output of the alert.

In a further aspect of the present disclosure, the second sensor system may include an unmanned aerial vehicle (UAV), an unmanned ground vehicle (UGV), and/or a robotic surveillance system.

In yet a further aspect of the present disclosure, the instructions, when executed by the processor, may further cause the system to receive the second signal from the second sensor system. The second signal may include an optical signal, a global positioning system (GPS) signal, an infrared signal, a RADAR signal, and/or a LIDAR signal.

In another aspect of the present disclosure, the first signal may be a real-time streaming protocol (RTSP) signal and the second signal may be a real-time messaging protocol (RTMP) signal.

In another aspect of the present disclosure, the instructions, when executed by the processor, may further cause the system to convert the second signal from an RTSP signal to a RTMP signal.

In a further aspect of the present disclosure, the instructions, when executed by the processor, may further cause the system to generate a second fused signal stream, based on the first signal and the second signal; and refine the provided confidence level of the potential threat using a machine learning network, based on the second fused signal stream.

In yet a further aspect of the present disclosure, the anomalous behavior model and the machine learning network may include a convolutional neural network (CNN), a generative adversarial network (GAN), and/or a recurrent neural network (RNN).

In accordance with an aspect of the present disclosure, a processor-implemented method for detecting a potential threat includes accessing a first signal from a first sensor system, the first signal including an optical signal, an infrared signal, a radio detection and ranging (RADAR) signal, or a light detection and ranging (LIDAR) signal; generating a first fused signal stream, using sensor fusion, based on the first signal; providing a confidence level of a potential threat, based on the first fused signal stream, using an anomalous behavior model; determining that the confidence level of the provided confidence level of the potential threat exceeds a predetermined threshold; and outputting an alert indicating a condition of the potential threat.

In an aspect of the present disclosure, providing the potential threat may include identifying an individual having a firearm, a knife, and/or an explosive device.

In another aspect of the present disclosure, providing the confidence level of the potential threat may include identifying an anomalous behavior of the individual, the anomalous behavior including patting, staring, and/or wandering by the individual.

In yet another aspect of the present disclosure, the method may further include activating a second sensor system configured to detect a second signal, based on outputting the alert.

In a further aspect of the present disclosure, the second sensor system may include an unmanned aerial vehicle (UAV), an unmanned ground vehicle (UGV), and/or a robotic surveillance system.

In yet a further aspect of the present disclosure, the method may further include receiving the second signal from the second sensor system. The second signal may include an optical signal, a global positioning system (GPS) signal, an infrared signal, a RADAR signal, and/or a LIDAR signal.

In another aspect of the present disclosure, the method may further include converting the second signal from a RTSP signal to a RTMP signal. The first signal may be a real-time streaming protocol (RTSP) signal and the second signal may be a real-time messaging protocol (RTMP) signal.

In yet another aspect of the present disclosure, the method may further include generating a second fused signal stream, based on the first signal and the second signal; and refining the provided confidence level of the potential threat using a machine learning network, based on the second fused signal stream.

In a further aspect of the present disclosure, the anomalous behavior model and the machine learning network may include a convolutional neural network (CNN), a generative adversarial network (GAN), and/or a recurrent neural network (RNN).

In accordance with an aspect of the present disclosure, a non-transitory computer readable storage medium includes instructions that, when executed by a computer, cause the computer to perform a method for detecting a potential threat. The method includes accessing a first signal from a first sensor system, the first signal including an optical signal, an infrared signal, a radio detection and ranging (RADAR) signal, or a light detection and ranging (LIDAR) signal; generating a first fused signal stream, using sensor fusion, based on the first signal; providing a confidence level of a potential threat, based on the first fused signal stream, using an anomalous behavior model; determining that the confidence level of the provided confidence level of the potential threat exceeds a predetermined threshold; and outputting an alert indicating a condition of the potential threat.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
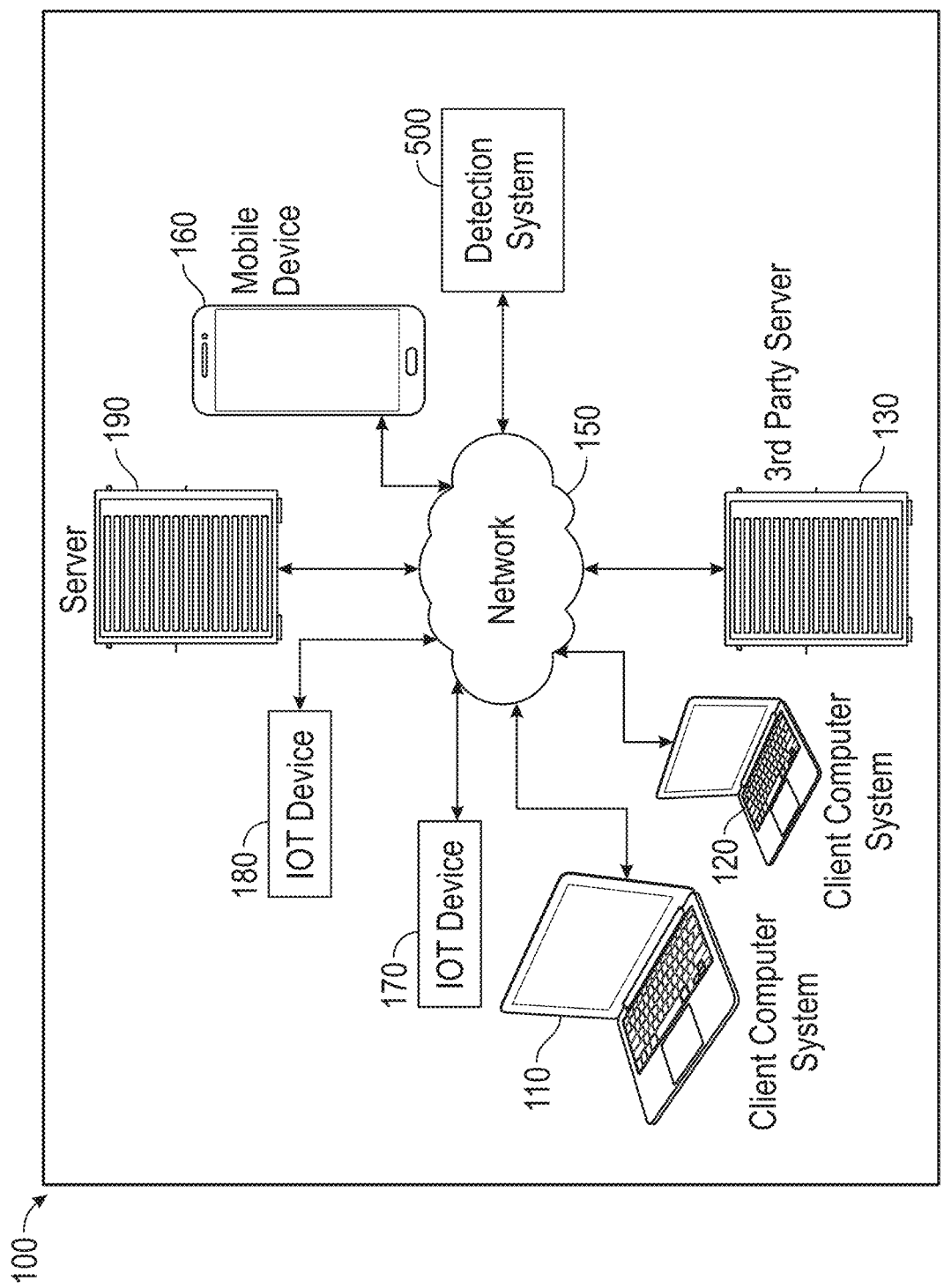
FIG. 1 is an illustration of a surveillance system, in accordance with aspects of the present disclosure.

The present application relates to systems and methods for weapon detection, and, more specifically, to a system and method which utilize artificial intelligence for automatically detecting multiple categories of weapons.

For the purpose of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Various alterations, rearrangements, substitutions, and modifications of the features illustrated herein, and any additional applications of the principles of the present disclosure as illustrated herein, which would occur to one skilled in the relevant art and having possession of this disclosure, are to be considered within the scope of the present disclosure.

As used herein, a "user" includes an entity, which can be a human, an organization, a group, and/or automated system, or any other identifiable entity, that interacts with a computer system, software application, a piece of software acting on behalf of another entity, and/or technology platform to perform actions, access resources, and/or receive information. The user typically has a unique identifier (e.g., username or ID) and may have associated permissions or privileges governing their interactions with the system.

The present disclosure may be utilized by and/or incorporated into a surveillance and/or weapons detection system. Exemplary components of the system may include radar systems, infrared cameras, deep learning workstations, data fusion servers, alerting system components, testing environments, documentation tools, and security tools (e.g., encryption, firewalls, secure access controls and/or cybersecurity measures). The system herein develops innovative, advanced sensor fusion methodologies leveraging phased array radar systems, electro-optical video streams, and infrared cameras. It will be understood that the technology in the present disclosure is configured to operate on a variety of devices, as described herein.

The disclosure herein addresses the challenge of parsing multiple information streams. The system amalgamates data from distinct modalities, allowing for inferences beyond the capacity of individual sensors alone. In doing so, system enhances the ability to swiftly steer multiple data sources into a narrow beam, which facilitates the identification and targeting of multiple weapons simultaneously, without the need for physical system movement. This contrasts with legacy radar systems employing spinning antennas and handheld devices that track moving objects. By combining inputs from multiple sensors, the platform aims to surpass the capabilities of single-sensor systems while mitigating their inherent limitations. This holistic approach to sensor fusion is integral to an efficient target acquisition and cueing system for weapons.

Efficient data management, interpretation, and analysis are also components of the present disclosure, considering the diverse and voluminous input from heterogeneous sensors. The outcome is a detection, identification, and tracking process for weapons within seconds, a significant leap from the minutes traditionally required. The urgency of achieving low system latency in detecting and tracking increasing weapon numbers is underscored, especially in real-world scenarios where timely response is paramount. Leveraging recent strides in deep learning, the system pioneers an unprecedented deep learning-based algorithm for multi-sensor data fusion in countering weapons. This innovative approach harnesses the complexities of middle-wave infrared (MWIR) and long-wave infrared (LWIR) imaging, electro-optical video streams, radar systems, and deep learning techniques.

By integrating deep learning algorithms with multiple sensors, the present disclosure revolutionizes the landscape of low-latency target detection and tracking. This innovative, game-changing approach aligns seamlessly with advancing the application of deep learning on multi-sensor data fusion and exploitation systems for accelerated weapons detection, identification, and tracking. The platform leverages artificial intelligence (AI) to analyze video streams (e.g., electro-optical streams) from sensors including surveillance cameras in real-time to detect firearms in schools, hospitals, and other public places. The accuracy and speed of weapon detection, identification, and tracking is significantly enhanced while achieving a low system latency without the need for physical use movement.

The present disclosure meets the processing needs and throughput requirements for weapons detection solutions at the edge through high-performance edge computing. This provides a benefit over traditional surveillance systems through reduced latency in data processing (allowing for real-time weapons detection), enhanced system resilience and reliability (especially in scenarios where centralized processing may face connectivity challenges), and increased autonomy in decision-making at the edge, minimizing dependencies on centralized processing. A seamless integration of edge computing infrastructure with the overall weapons detection system architecture is provided, enables coordination between edge servers and central processing units to ensure synchronized data processing and analysis. Further, the edge computing structure is scalable to adapt to varying swarm sizes and processing demands, with provisions for easy scalability to handle increasing complexities in weapons detection. Moreover, robust security protocols for edge computing, including encryption, secure boot mechanisms, and access controls and provided, including regular security updates and monitoring to address potential vulnerabilities.

High-performance edge servers may be equipped with advanced CPUs and GPUs to support real-time processing. Such servers can have compact and ruggedized designs suitable for deployment in diverse environments, including field applications. Further, implementation of edge computing software may optimize the execution of algorithms and data fusion at the edge, with an integration with the overall system architecture for seamless data flow between edge servers and central processing units. Robust edge connectivity solutions can ensure efficient communication between edge devices and the central processing infrastructure, with implementation of low-latency communication protocols for real-time data transmission. Edge computing solutions are also energy-efficient edge computing solutions to accommodate scenarios where power sources may be limited, with integration of power management features to optimize energy consumption without compromising performance.

In addition, the system is configured to adhere to applicable environmental laws and regulations at the national, federal, state, and/or local levels. Overall, the edge computing infrastructure is designed to withstand environmental challenges, including temperature variations, humidity, and potential exposure to elements, and adequate protection measures ensure the longevity and reliability of edge servers in diverse operational conditions. For example, the platform is configured to comply with standards for airborne emissions, waterborne effluents, outdoor noise, solid and bulk waste disposal, and proper handling and/or storage of toxic and hazardous materials.

Referring to FIG. 1, there is shown an illustration of an exemplary surveillance system 100 in accordance with aspects of the present disclosure. The surveillance system 100 includes one or more client computer systems 110, 120, a third party server and/or cloud system 130, a network 150, one or more mobile devices 160, one or more Internet of things (IoT) devices 170, 180, a server 190, and/or detection system 500. The client computer systems 110, 120 communicate with the server 190 across the network 150. In aspects, multiple servers 190 may be used in a distributed architecture and/or in a cloud. System 100 solves the technical problem of high-speed, low latency data processing for weapons detection by providing the technical solution of a multi-cloud detection system that is compatible with present surveillance systems. Moreover, system 100 solves the technical problem of rapid, accurate weapons detection by providing the technical solution of sensor fusion for multiple high-definition signals, combined with the use of multiple machine learning models for accurate predictive analysis.

The network 150 may be wired or wireless, and can utilize technologies such as Wi-Fix, Ethernet, Internet Protocol, 4GR, and/or 5GR, or other communication technologies. The network 150 may include, for example, but is not limited to, a cellular network, residential broadband, satellite communications, private network, the Internet, local area network, wide area network, storage area network, campus area network, personal area network, or metropolitan area network.

As will be described in more detail below, the cloud system/server 130 may implement statistical models and/or machine learning models (e.g., neural network) that process the collected data to identify potential threats. The term "machine learning model" may include, but is not limited to, neural networks, recurrent neural networks (RNN), generative adversarial networks (GAN), decision trees, Bayesian Regression, Naive Bayes, nearest neighbors, least squares, means, and support vector machine, among other data science and machine learning techniques which persons skilled in the art will recognize.

The illustrated networked environment is merely an example. In embodiments, other systems, servers, and/or devices not illustrated in FIG. 1 may be included. In embodiments, one or more of the illustrated components may be omitted. Such and other embodiments are contemplated to be within the scope of the present disclosure.

Figure 2:
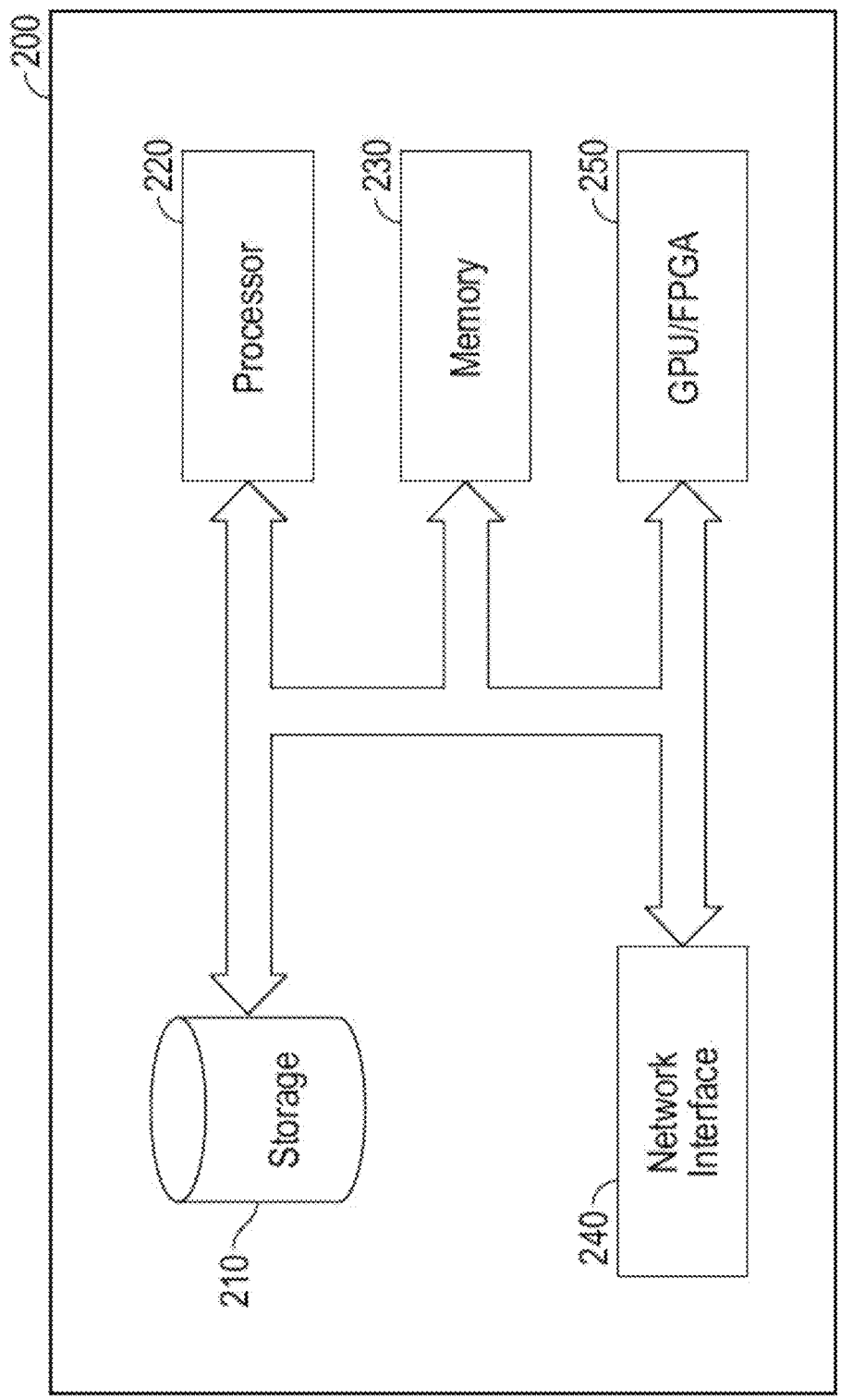
FIG. 2 is a block diagram of example components of a controller within the surveillance system of FIG. 1, in accordance with aspects of the present disclosure.

Referring now to FIG. 2, exemplary components of a controller 200 are shown. The controller 200 generally includes a storage or database 210, one or more processors 220, at least one memory 230, and a network interface 240. In aspects, the controller 200 may include a graphical processing unit (GPU) 250, which may be used for processing machine learning network models.

The database 210 can be located in storage. The term "storage" may refer to any device or material from which information may be capable of being accessed, reproduced, and/or held in an electromagnetic or optical form for access by a computer processor. Storage may be, for example, volatile memory such as RAM, non-volatile memory, which permanently holds digital data until purposely erased, such as flash memory, magnetic devices such as hard disk drives, and optical media such as a CD, DVD, Blu-ray Disc™, or the like.

In aspects, data may be stored on the controller 200, including, for example, user accounts, camera data, video streams, and/or other data. The data can be stored in the database 210 and sent via the system bus to the processor 220. The database 210 may store information in a manner that satisfies information security standards and/or government regulations, such as Systems and Organization Controls (e.g., SOC 2), General Data Protection Regulation (GDPR), and/or International Organization for Standardization (ISO) standards.

As will be described in more detail later herein, the processor 220 executes various processes based on instructions that can be stored in the at least one memory 230 and utilizing the data from the database 210. With reference also to FIG. 1, a request from a user device, such as a mobile device or a client computer, can be communicated to the controller 200 through the network interface 240. The illustration of FIG. 2 is exemplary, and persons skilled in the art will understand that other components may exist in controller 200. Such other components are not illustrated for clarity of illustration.

Figure 3:
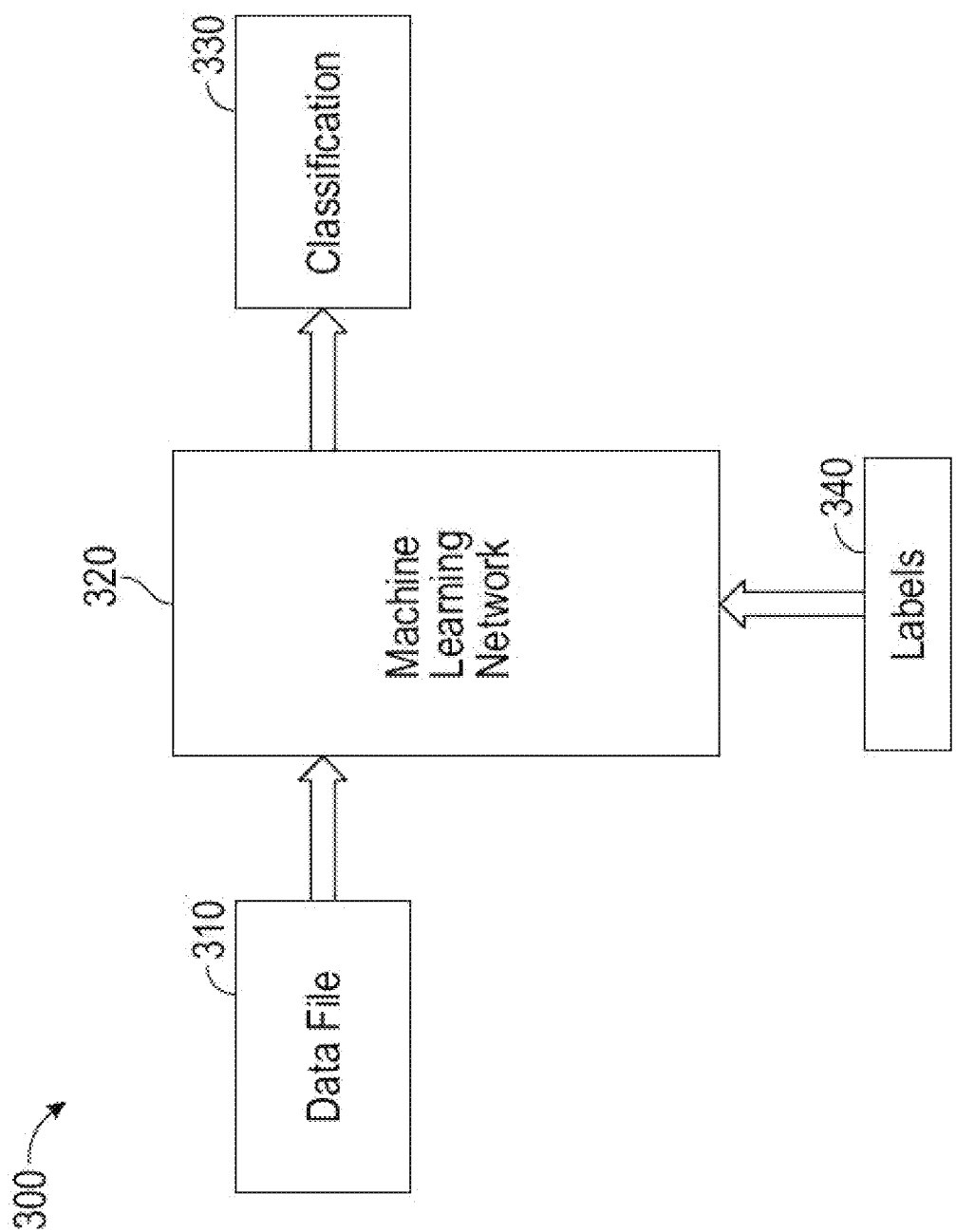
FIG. 3 is a block diagram of a machine learning network with inputs and outputs of a deep learning neural network, in accordance with aspects of the present disclosure.

With reference to FIG. 3, a block diagram of a classification model 300, including a machine learning network 320, for classifying data in accordance with some aspects of the disclosure is shown. In some systems, a machine learning network 320 may include, for example, a convolutional neural network (CNN), a regression and/or a recurrent neural network. A deep learning neural network includes multiple hidden layers. As explained in more detail below, the machine learning network 320 may leverage one or more classification models 330 (e.g., CNNs, decision trees, a regression, Naive Bayes, k-nearest neighbor) to classify data. In aspects, the classification model 300 may use a data file 310 and labels 340 for classification. The machine learning network 320 may be executed on the controller 200 (FIG. 2). Persons of ordinary skill in the art will understand the machine learning network 320 and how to implement it.

In machine learning, a CNN is a class of artificial neural network (ANN). The convolutional aspect of a CNN relates to applying matrix processing operations to localized portions of data, and the results of those operations (which can involve dozens of different parallel and serial calculations) are sets of many features that are delivered to the next layer. A CNN typically includes convolution layers, activation function layers, deconvolution layers (e.g., in segmentation networks), and/or pooling (typically max pooling) layers to reduce dimensionality without losing too many features. Additional information may be included in the operations that generate these features. Providing unique information, which yields features that give the neural networks information, can be used to provide an aggregate way to differentiate between different data input to the neural networks.

Figure 4:
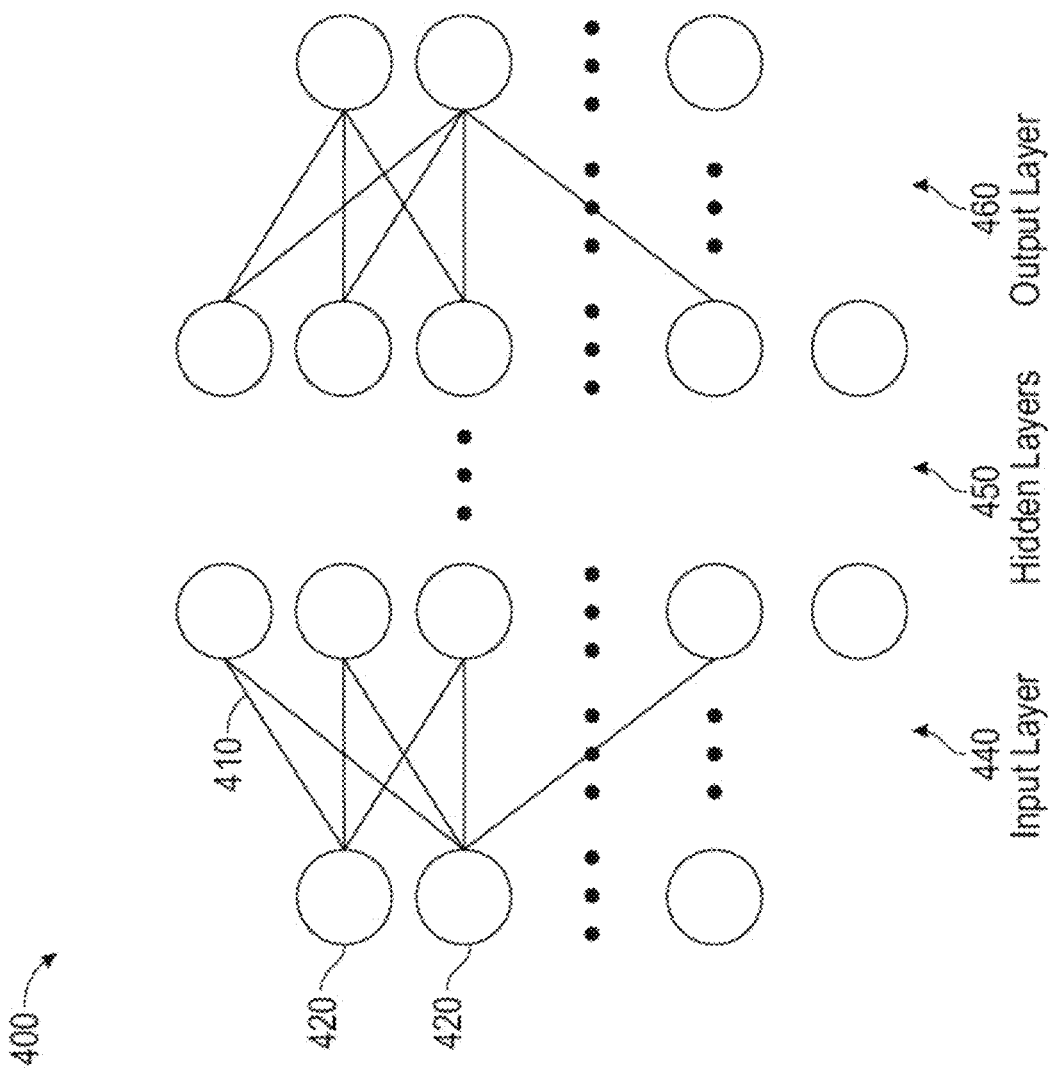
FIG. 4 is a diagram of layers of the machine learning network of FIG. 3, in accordance with aspects of the present disclosure.

Referring to FIG. 4, generally, a machine learning network 320 (e.g., a convolutional deep learning neural network) includes at least one input layer 440, a plurality of hidden layers 450, and at least one output layer 460. The input layer 440, the plurality of hidden layers 450, and the output layer 460 all include neurons 420 (e.g., nodes). The neurons 420 between the various layers are interconnected via weights 410. Each neuron 420 in the machine learning network 320 computes an output value by applying a specific function to the input values coming from the previous layer. The function that is applied to the input values is determined by a vector of weights 410 and a bias. Learning, in the deep learning neural network, progresses by making iterative adjustments to these biases and weights. The vector of weights 410 and the bias are called filters (e.g., kernels) and represent particular features of the input (e.g., a particular shape). The machine learning network 320 may output logits. Although CNNs are used as an example, other machine learning classifiers are contemplated.

The machine learning network 320 may be trained based on labeling training data to optimize weights. For example, samples of feature data may be taken and labeled using other feature data. In some methods in accordance with this disclosure, the training may include supervised learning or semi-supervised learning. Persons of ordinary skill in the art will understand training the machine learning network 320 and how to implement it.

Figure 5:
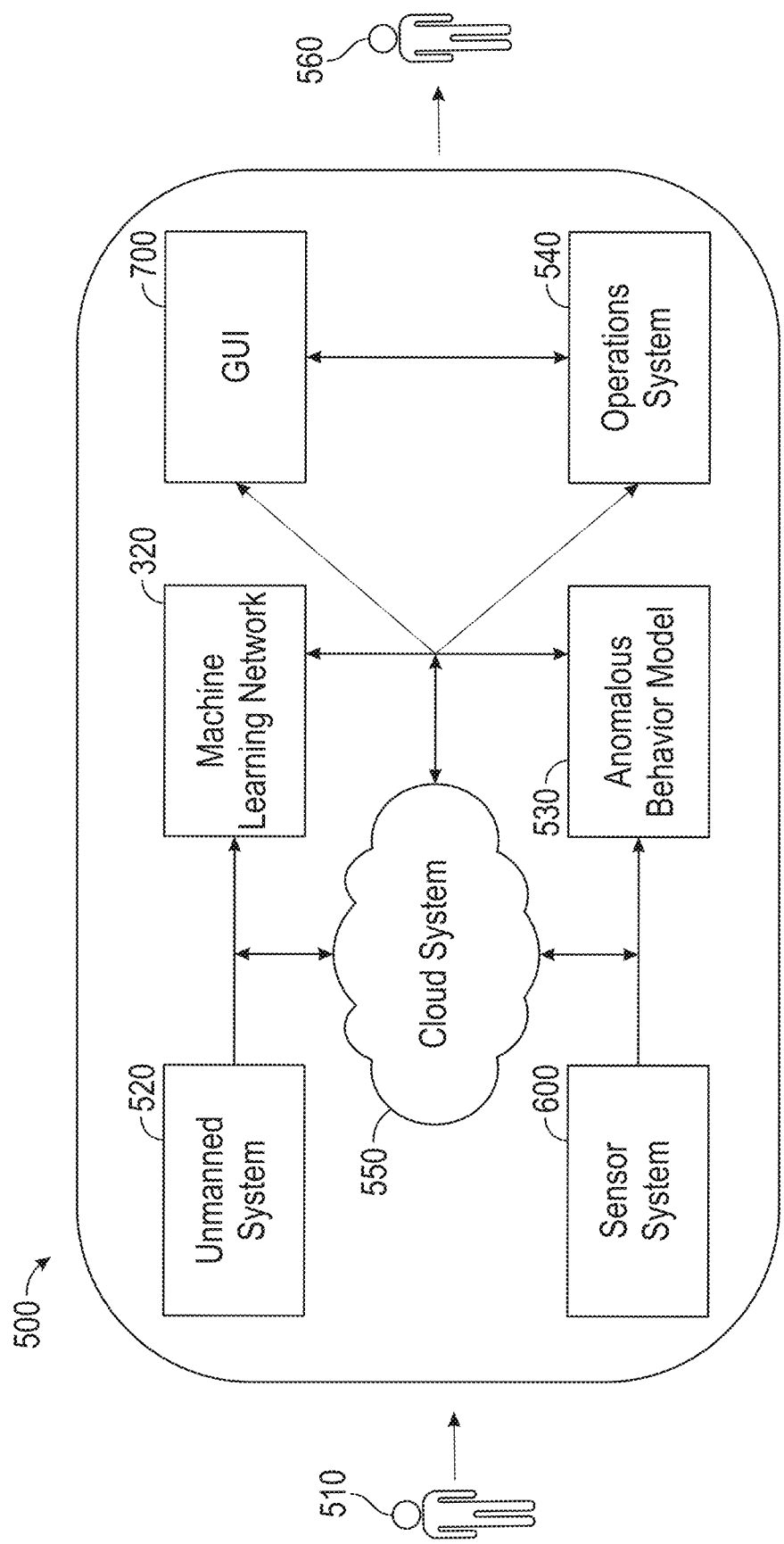
FIG. 5 is an illustration of a detection system within the surveillance system of FIG. 1, in accordance with aspects of the present disclosure.

With reference to FIG. 5, detection system 500 may include a sensor system 600 (e.g., a first sensor system), an unmanned system 520 (e.g., a second sensor system), machine learning network 320, anomalous behavior model 530, cloud system 550, operations system 540, and/or GUI 700. Additional components, such as security and network tools, are contemplated and within the scope of this disclosure. For example, cloud system 550 may interface with a firewall which connects with an external camera network, router, and/or battery backup. In another example, unmanned system 520 may interface with a broadband unit. Moreover, while communication is shown in certain directions in FIG. 5, such directions are merely exemplary, and any components of detection system 500 and/or surveillance system 100 may communicate with one another, in any direction.

Potential threat 510 may be an individual with a weapon, which detection system 500 is configured to identify and track in order to provide real-time alerts. For example, the potential threat 510 may be an individual with a weapon in a populated area (e.g., an active shooter), such as a school, workplace, arena, or other public space. The weapon may include various dangerous devices, such as a firearm, knife, and/or explosive device. However, it will be understood that potential threat 510 may broadly include various types of threats. For example, potential threat 510 may include an intruder gaining access to an unauthorized area, either by bypassing physical security measures or exploiting vulnerabilities in a security system. In another example, potential threat 510 may be an individual attempting to steal valuable assets from a facility. Additional threats, such as vandalism, civil unrest, terrorism, and/or natural disasters are also contemplated for recognition by detection system 500.

Figure 6:
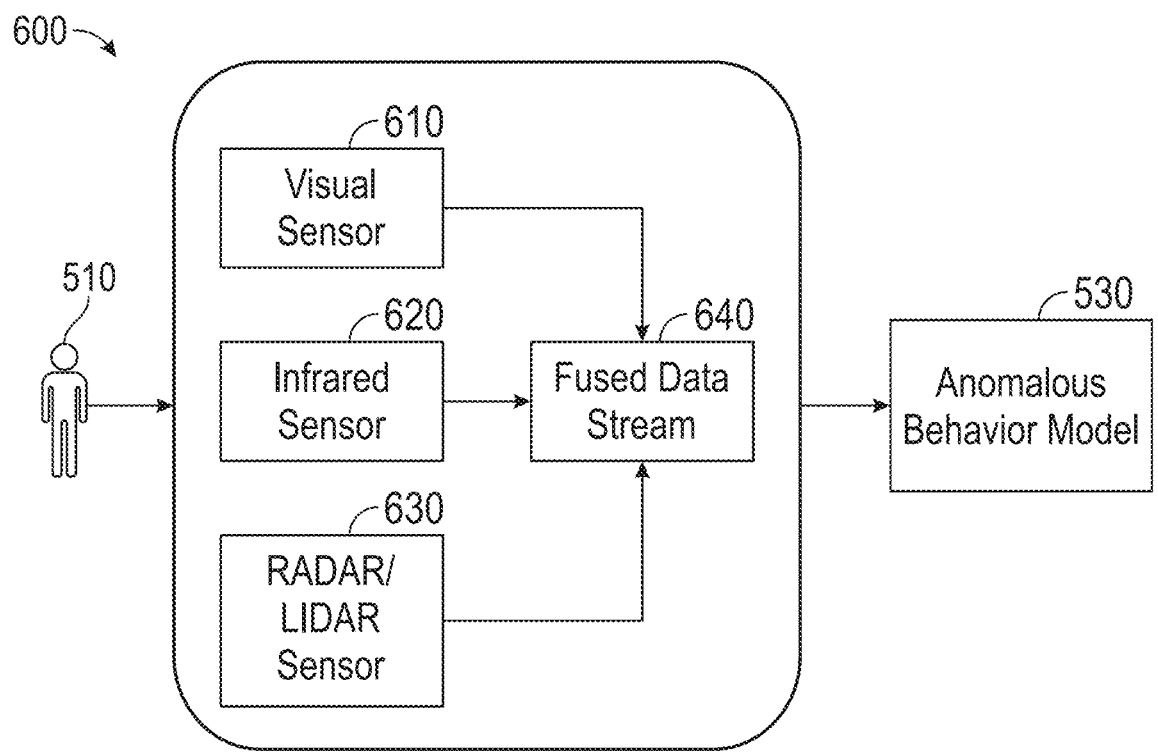
FIG. 6 is a diagram illustrating various sensors of a sensor system within the detection system of FIG. 5.
Figure 7:
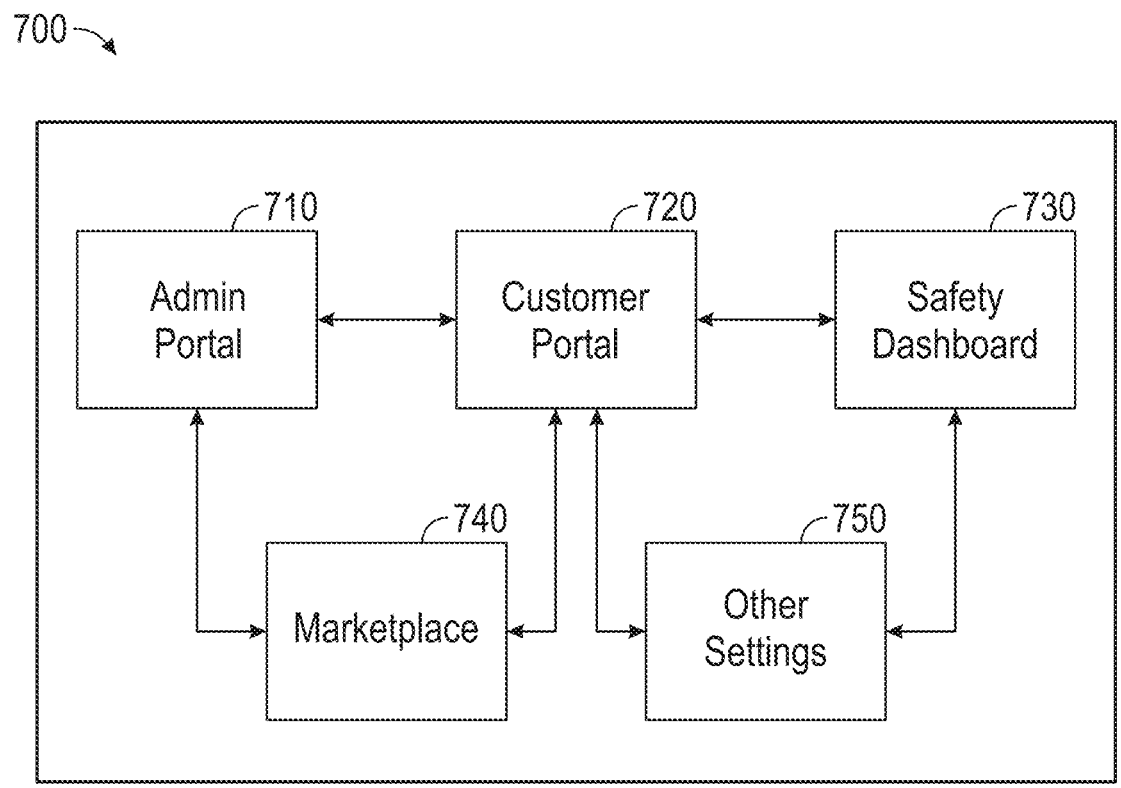
FIG. 7 is a diagram of various subsystems within the detection system of FIG. 5, in accordance with aspects of the present disclosure.
Figure 8:
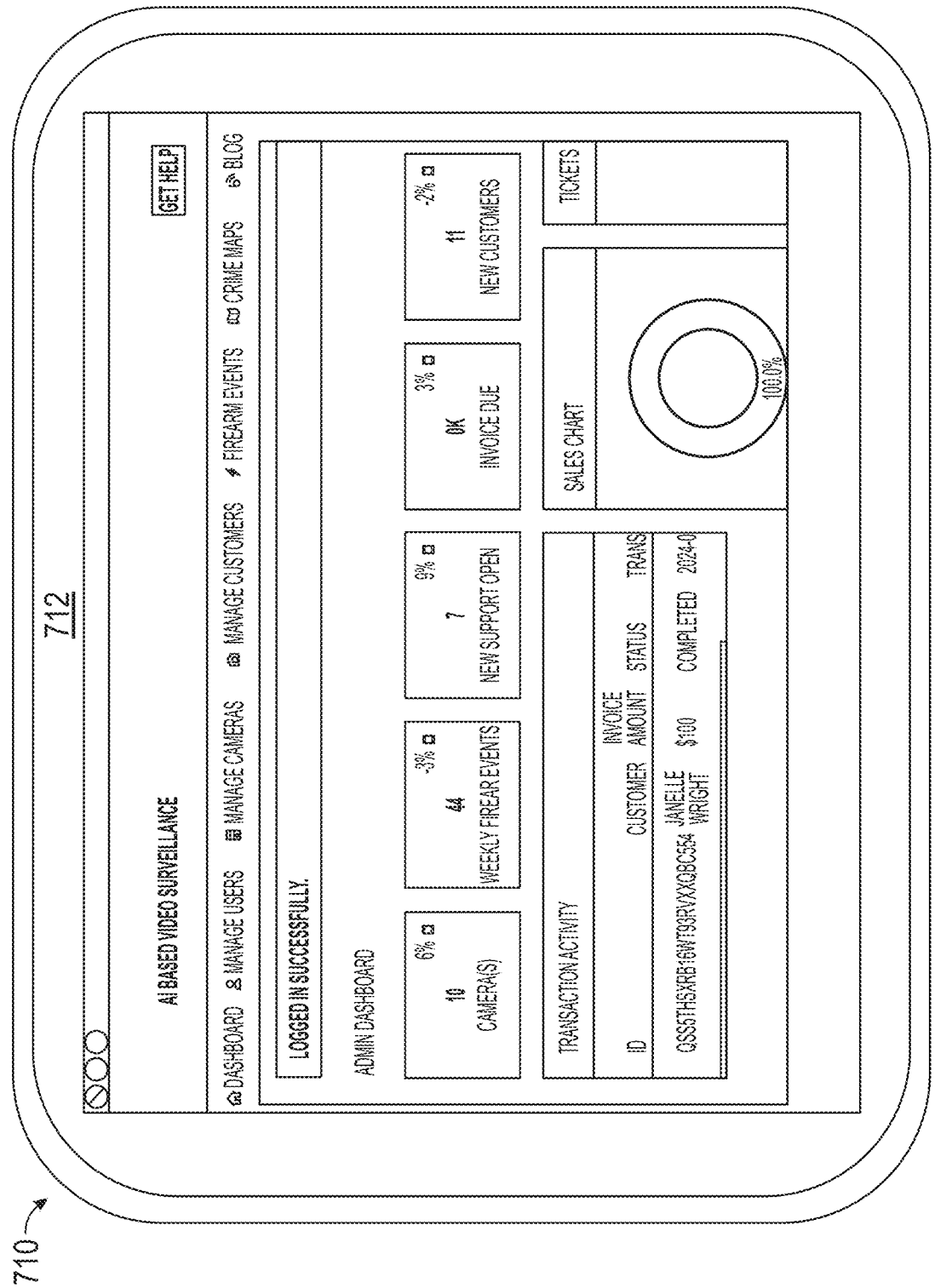
FIGS. 8-10 are exemplary interfaces of the subsystems of FIG. 7, in accordance with aspects of the present disclosure.

With reference to FIG. 6, sensor system 600 may include a variety of sensors (e.g., sensor system 600 and/or unmanned system 520), configured to capture data in real-time, allowing for continuous monitoring and recording. The sensors generally connect to detection system 500 via the Internet (e.g., via network 150). Typically, sensor system 600 includes a visual sensor 610 (e.g., a surveillance camera), an infrared sensor 620 (e.g., an infrared (IR) or thermal camera), and/or a radio detection and ranging (RADAR) and light detection and ranging (LIDAR) sensor, i.e., a RADAR/LIDAR sensor 630 (e.g., a RADAR/LIDAR sensor system). Visual sensor 610, infrared sensor 620, and RADAR/LIDAR sensor 630 may be individual sensors in cameras or combined into a multi-sensor system for use with detection system 500. Generally, all sensors enable high-resolution capture of data and real-time streaming capabilities. In aspects, sensors may be included with detection system 500 and/or retrofitted from an existing system.

Visual sensor 610 is configured to capture and convert visible light (e.g., image data) to electrical signals (e.g., electro-optical data) to form digital images and videos. In aspects, visual sensor 610 may include and/or be utilized with dome cameras, bullet cameras, pan-tilt-zoom cameras, body-worn cameras, smartphone cameras, 360-degree cameras, and/or other surveillance cameras. For example, visual sensor 610 may be a surveillance camera including a lens (e.g., fixed or varifocal lens), an aperture, an image sensor (e.g., a charge-coupled device (CCD) sensor or a complementary metal-oxide-semiconductor (CMOS) sensor) with photosensitive pixels, a storage, a memory, an image processing unit, a display, and/or a network interface. In aspects, visual sensor 610 may include noise reduction, color correction, and/or compression capabilities.

Infrared sensor 620 is configured to capture infrared radiation, e.g., heat signatures. In aspects, infrared sensor 620 may include microbolometers and/or photodetectors. Infrared sensor 620 may include and/or be utilized with mid-wave infrared (MWIR) cameras, long-wave infrared (LWIR) cameras, thermal cameras, near-infrared cameras, and/or other infrared cameras. For example, infrared sensor 620 may be a high-resolution, MWIR camera with real-time streaming capabilities. The MWIR camera may include a MWIR sensor (e.g., indium antimonide (InSb), mercury cadmium telluride (MCT) detector, or focal plane array (FPA)), a cooling system (e.g., cryogenic coolers), an optical lens, an infrared filter (e.g., bandpass or cold filters), a signal processor (e.g., analog-to-digital converter (ADC), digital signal processor (DSP), and image enhancement algorithms), a calibration mechanism, a storage, a memory, a display, and/or a network interface.

RADAR/LIDAR sensor 630 is configured to capture motion and/or distances to objects. For example, RADAR/LIDAR sensor 630 may include and/or be utilized with phased array RADAR, pulse RADAR, continuous wave (CW) RADAR, multispectral LIDAR, wavelength modulated LIDAR, and/or other RADAR and LIDAR cameras. For example, RADAR/LIDAR sensor 630 may include a high-frequency, phased array RADAR sensor configured to emit and receive reflected radio frequency (RF) signals, with beam-steering capabilities. The RADAR sensor may include a transmitter (e.g., radar antenna or RF oscillator), receiver (e.g., radar antenna or low-noise amplifier), a signal processor (e.g., analog-to-digital converter (ADC), digital signal processor (DSP)), a timing system, a control unit, a calibration system, a storage, a memory, a display, and/or a network interface. In another example, RADAR/LIDAR sensor 630 may include a LIDAR sensor, configured to emit and receive reflected laser light. The LIDAR sensor may include a laser source (e.g., laser diode, solid-state laser, or laser scanner), a receiver (e.g., photodetector, photodiode, or optical filter), signal processor (e.g., analog-to-digital converter (ADC), digital signal processor (DSP)), a timing system, a control unit, a calibration system, a storage, a memory, a display, and/or a network interface. RADAR/LIDAR sensor 630 may be a combined multi-sensor system or individual RADAR and LIDAR sensors and/or cameras. By utilizing both RADAR and LIDAR sensors, RADAR/LIDAR sensor 630 provides an advantage over individual sensors by providing higher precision distance measurements and spatial resolutions, e.g., detailed information about objects and surfaces at a mitigated cost.

Various data (e.g., signals) captured from modules of sensor system 600 may be combined in real-time via sensor fusion of the data output to produce a fused data stream 640 (e.g., a fused signal stream). For example, data from visual sensor 610, infrared sensor 620, and/or RADAR/LIDAR sensor 630 may be extrapolated, combined, and/or related to a single event. Data fusion may occur on dedicated data fusion servers with high-speed data processing capabilities (e.g., server 190), locally (e.g., detection system 500) and/or within a cloud-based system. Typically, any sensors used will be preemptively calibrated relative to one another. For example, fields of view may be aligned, and cameras may be synchronized in terms of timing and/or orientation. Next, if the sensors have different resolutions, they may need to be resampled or resized so that the corresponding pixels in both images align. In aspects, noise reduction techniques may be applied to images to enhance quality of the data and/or minimize the impact of sensor-specific noise. Thereafter, image registration may occur, including geometric alignment (e.g., aligning images so that corresponding points match spatially) and/or transformation models (e.g., using affine, projective, or non-linear transformation models to align images, depending on a level of distortion). In aspects, feature extraction may be used to identify key features in both images, including edges, textures, and/or colors.

Sensor system 600 may utilize data level fusion, (e.g., aggregation of raw data from all sensors into a common format, such as pixels), feature level fusion (e.g., extracting and combining relevant features from each sensor for multimodal object detection, pattern recognition, and/or predictive algorithms), and/or decision level fusion (e.g., consensus algorithms and weighted voting). In aspects, fused data stream 640 may be processed using Kalman filtering, machine learning, and/or deep learning algorithms. Fused data stream 640 may be processed using coordinate transformation and alignment to produce a coordinate system including a spatial position, orientation, and/or timestamp related to potential threat 510. After fusion, post-processing techniques may be applied to the resultant data, such as contract and brightness adjustment and/or filtering techniques (e.g., edge enhancement, smoothing, and sharpening).

By utilizing electro-optical, infrared, RADAR, and/or LIDAR signals together, sensor system 600 provides an advantage over current detection system by producing a more accurate, reliable, and comprehensive understanding of an environment, e.g., a potential threat 510. Overall, integration of the data from each sensor capitalizes on their strengths while mitigating their weaknesses, making detection system 500 adaptable to a wider range of environments and scenarios than traditional detection systems. For example, RADAR/LIDAR may be particularly advantageous during periods of decreased visibility, (e.g., when electro-optical and/or infrared cameras may have decreased efficacy such as rain, snow, or low light), as data captured by RADAR/LIDAR sensor 630 is unaffected by such factors.

Unmanned system 520 may include various types of unmanned and/or autonomous systems used for surveillance. For example, unmanned system 520 may include unmanned aerial vehicles (UAVs) equipped with cameras and sensors, such as drones, unmanned ground vehicles (UGVs), and/or unmanned aircraft systems (UAS). In addition, and/or alternatively, unmanned system 520 may include a robotic surveillance system. The robotic surveillance system may be an automated or semi-automated system that uses robots equipped with various sensors and communication technologies to monitor and observe an environment for security, reconnaissance, and/or data collection purposes. For example, the robotic surveillance system may include an automated surveillance robot or a humanoid robot (e.g., a bipedal robot) configured with surveillance cameras. Overall, unmanned system 520 provides an advantage over traditional weapons detection systems by additionally providing surveillance in environments that may be hazardous, inaccessible, or where continuous human presence is impractical. Generally, unmanned system 520 may capture data including a variety of onboard and/or remote sensors. In aspects, unmanned system 520 may include sensors similar to sensor system 600 (e.g., visual sensor 610, infrared sensor 620, and/or RADAR/LIDAR sensor 630), in addition to other sensors. For example, unmanned system 520 may include a global positioning system (GPS) configured to provide a spatial location and/or coordinates of potential threat 510, which may be compatible with location applications within a computer and/or smartphone. Data captured from unmanned system 520 typically includes a real-time messaging protocol (RTMP) signal, which is then converted to a real-time streaming protocol (RTSP) signal, e.g., a stationary stream.

In aspects, modules of sensor system 600 and/or unmanned system 520 may include edge computing and analytics to process data locally for real-time analytics, including facial recognition, behavior analysis, and/or object detection and recognition, such as license plate recognition. In addition, modules of sensor system 600 and/or unmanned system 520 may include further detection features, such as tamper detection (e.g., when a camera is being obstructed, moved, or tampered with), environmental sensors, and two-way audio capabilities (e.g., a microphone to capture audio in video footage and a two-way communication with an intercom for deterrence purposes). In aspects, data captured by sensor system 600 and/or unmanned system 520 may be automatically encrypted and/or required to pass through a network firewall.

With further reference to FIG. 5, anomalous behavior model 530 and/or machine learning network 320 and are configured to analyze the fused data stream (e.g., electro-optical, infrared, RADAR, and/or LIDAR data) to identify a potential threat 510, with a general focus on weapon detection. Machine learning network 320 generally utilizes a convolutional neural network (CNN) for image-based recognition and/or a generative adversarial network (GAN) for scenario simulations and/or training enhancement, thereby allowing for robust and adaptive learning capabilities for detection of potential threat 510. Generally, anomalous behavior model 530 (i.e., "Analysmart") is a standalone module configured for statistical analysis, which focuses on crime predictions within historical data compared against image feeds. For example, anomalous behavior model 530 may be configured to analyze abnormal acoustic patterns and/or thermal anomalies. Anomalous behavior model 530 is configured to complement the machine learning network 320 and other neural networks.

Machine learning network 320 and/or anomalous behavior model 530 employ trained models to enhance accuracy of weapon detection and reduce false positives and negatives. Generally, machine learning network 320 and anomalous behavior model 530 are trained based on images and videos of weapons. For example, images and videos of various makes and models of weapons with different lightings, angles, and individuals holding said weapons may be provided. Training typically involves datasets enriched with varied weapon images, videos, and/or associated behaviors (e.g., 15-50 images per weapon). Using object detection techniques, machine learning network 320 and anomalous behavior model 530 may be trained to analyze specific features such as size, shape, and other distinguishing characteristics (e.g., long and short barrels, make, model). For non-firearm weapons such as knives, non-standardized shapes and sizes may be filtered out during training using more complex pattern recognition algorithms.

In use, machine learning network 320 and/or anomalous behavior model 530 provide (e.g., predict) a confidence level related to potential threat 510. For example, a confidence level may indicate that potential threat 510 is actively present, or imminently approaching a location. As used herein, a "confidence level" (e.g., a confidence score ranging from 1-100%) represents the degree of certainty or probability that a given prediction (e.g., a classification) made by a model (e.g., machine learning network 320 and/or anomalous behavior model 530) is correct. Generally, a confidence level indicates how confident the model is that a particular input belongs to a certain class. For example, a confidence level of 85% may indicate an 85% chance that a neural network correctly predicted a rifle. The confidence level may be provided using a softmax function, which converts raw data from the model output (e.g., logits) into a probability distribution over all possible classes, where the highest probability represents the confidence level for the provided and/or predicted class. For example, if machine learning network 320 may classify images of weapons into one of ten categories and assign a probability of 0.85 (or 85%) to the class "rifle," denoting the confidence level for the prediction that the image is of a rifle.

Typically, anomalous behavior model 530 analyzes data captured from sensor system 600 (e.g., digital camera feeds) for subtle nuances to increase the confidence level of potential threat 510 where narrower surveillance data is available, while machine learning network 320 analyzes data from unmanned system 520 (e.g., UAV and/or drones), which generally provides broader surveillance with immediate threats and/or perimeter breaches to refine the confidence level of potential threat 510. In doing so, specific expanded behaviors classified as anomalies (e.g., labeled as suspicious and/or anomalous by law enforcement) may be detected through subtle movements by the potential threat 510. Examples may include patting (e.g., indication of a concealed weapon), prolonged staring (e.g., potential surveillance of an area), repeat visits form a previously detected individual, irregular wandering in a sensitive location (e.g., a public location such as a school, stadium, or government facility), which may be indicative of scouting or nervous behavior, and/or specified illicit behaviors.

Operations system 540 is configured to automatically alert authorized users (e.g., law enforcement and/or end user 560) regarding potential threat 510. Typically, operations system 540 will only proceed when a provided confidence level of potential threat 510 exceeds a certain threshold (e.g., a predetermined or preprogrammed threshold). In aspects, detection system 500 may be configured to automatically alert the authorities without verification and/or assistance from operations system 540. Generally, operations system 540 will automatically alert law enforcement, while providing an interface on GUI 700 for client verification and response to confirm a status of potential threat 510. This multi-response infrastructure provides an advantage over traditional weapons detection systems of both rapid initial reaction and subsequent verification to minimize false alarm impacts.

Generally, various additional verification measures are performed before and/or after authorized users are notified, which enhances accuracy of the confidence level of potential threat 510. For example, operations system 540 may leverage reinforced learning to identify and flag false positives and/or negatives (e.g., missed detections of potential threat 510) through a feedback mechanism. In the feedback mechanism, anomalies may be reviewed either via automated reanalysis (e.g., machine learning network 320 and/or anomalous behavior model 530), manually in the operations system 540 (e.g., by an individual in an operations center), and/or via a client-side interface (e.g., GUI 700). For example, machine learning, such as machine learning network 320, may utilize reinforced machine learning through a feedback loop. In another example, a prompt with data regarding potential threat 510 may appear on an interface, which prompts a "confirm" or "disregard" button. Any adjustments may then be fed back into machine learning network 320 and/or anomalous behavior model 530 to refine accuracy of the confidence level, decreasing the rate of errors overtime.

Detection system 500 may include numerous post-alert protocols. Generally, a client may continue to monitor potential threat 510 in real-time as an ongoing scenario develops. For example, an individual (e.g., end user 560) may open a ticket using a ticketing system on GUI 700 to request that detection system 500 continue monitoring the potential threat 510. This ticketing system may integrate user profiles that track interaction history and response times, enabling personalized security management. This provides an advantage over traditional weapons detection systems by enabling prioritized alerts based on user settings and historical data, optimizing response efforts. For example, the individual may toggle alerting for a specific potential threat 510 (e.g., firearms), and once alerted, may be able to simultaneously monitor a status of potential threat via GUI 700 and/or select a "neutralized" button when the potential threat 510 is neutralized (e.g., detained or removed from the area). In aspects, neutralization may be automatically provided (e.g., predicted) and/or input by machine learning.

Cloud system 550 is configured as a cloud-based data aggregation system, which consolidates data from all input sources into a unified data stream. Generally, cloud system 550 is a multi-cloud system, which includes the various AI algorithms and system interfaces of the system 500. For example, specific training algorithms utilized by machine learning network 320 and/or anomalous behavior model 530 may reside within cloud system 550. Cloud system 550 may be configured to preprocess various data used for analysis (e.g., by machine learning network 320), such as initial filtering algorithms used to manage data quality and reduce noise. Cloud system 550 may be designed for use with a variety of systems, such as surveillance system 100, and may be retrofitted with any equipment capable of connecting to the Internet (e.g., to any entity provided with the RTSP link). Any equipment and/or systems utilizing cloud system 550 may include a seamless integration with edge computing infrastructures, such as an overall weapons detection system architecture. The computing infrastructures may include scalable edge computing configured to adapt to varying swarm sizes and processing demands, and may include robust security measures (e.g., firewalls, encryption, secure boot mechanisms, and/or access controls protocols). Overall, such computing infrastructures, when utilized with cloud system 550, enable reduced latency in data processing, enhanced system reliability, and increased autonomy in decision-making. This provides a benefit over current surveillance systems by decreasing connectivity challenges in centralized processing, minimizing overall dependency on such central processing, and increasing overall response times for weapon detection.

With reference to FIGS. 7-10, GUI 700 enables the interaction of various modules within detection system 500. GUI 700 may include interfaces such as an administrative portal 710, a customer portal 720, a safety dashboard 730, a marketplace 740, and/or other settings 750. The administrative portal may include an administrative dashboard 712 (FIG. 8), which provides an overview of components connected to detection system 500. Typically, administrative dashboard 712 is a secure portal accessed by individuals within operations system 540, although it is contemplated that any individual with authorized access may utilize administrative dashboard 712. For example, the administrative dashboard 712 may display a number of connected cameras, weekly firearm events, support tickets open, invoices due, new customers, transaction activity, and/or sales charts, among other customer-related information. In aspects, a task bar may include options for adding, editing, deleting, and/or viewing data related to users, customers, firearm events, cameras, crime maps, and/or blogs.

Figure 9:
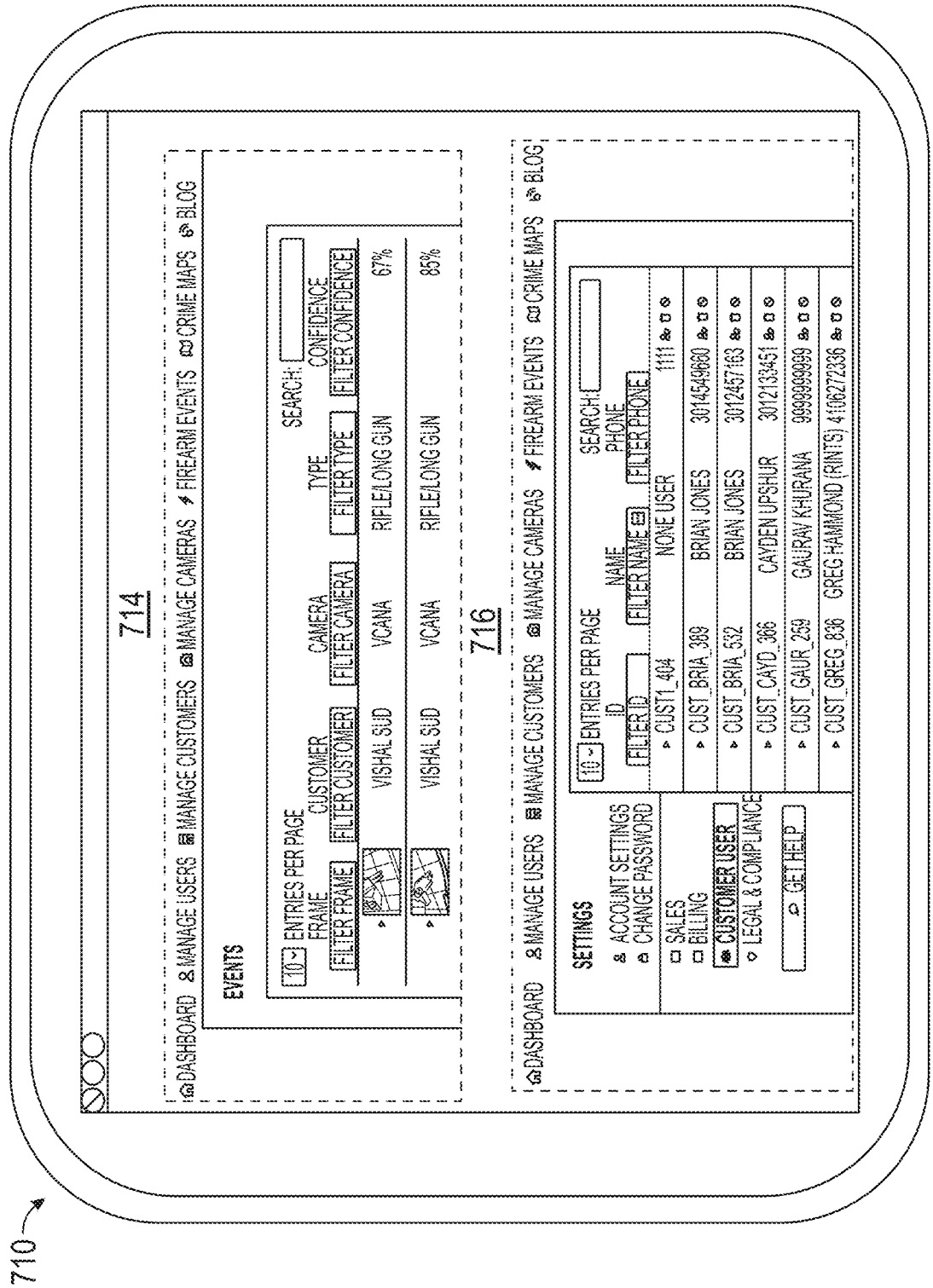

With further reference to FIG. 9, exemplary screens generally accessible through the administrative portal 710 are shown. In the event screen 714, an individual may view and/or filter through events. The events may be related to specific customers, cameras, threat types, and/or confidence levels regarding potential threat 510, with the option to view historical photos and videos. For example, an administrator may select videos from the prior monitoring related to any potential threat 510 involving a rifle/long gun, where the confidence level was greater than 60%. A dropdown may be available to expand the event information and provide further details on the scenario including potential threat 510. For example, a transcript of a phone call (e.g., 911), geospatial coordinates, public records (e.g., arrests), and/or timing to neutralization may be provided. In the settings screen 716, data may be viewed and/or managed including account settings, passwords, sales, billing, customer users, and/or legal and compliance information. For example, customer data may be viewed and filtered, such as customer ID, name, and/or phone number. In aspects, a chatbot or other contact feature may be available for immediate assistance.

Figure 10:
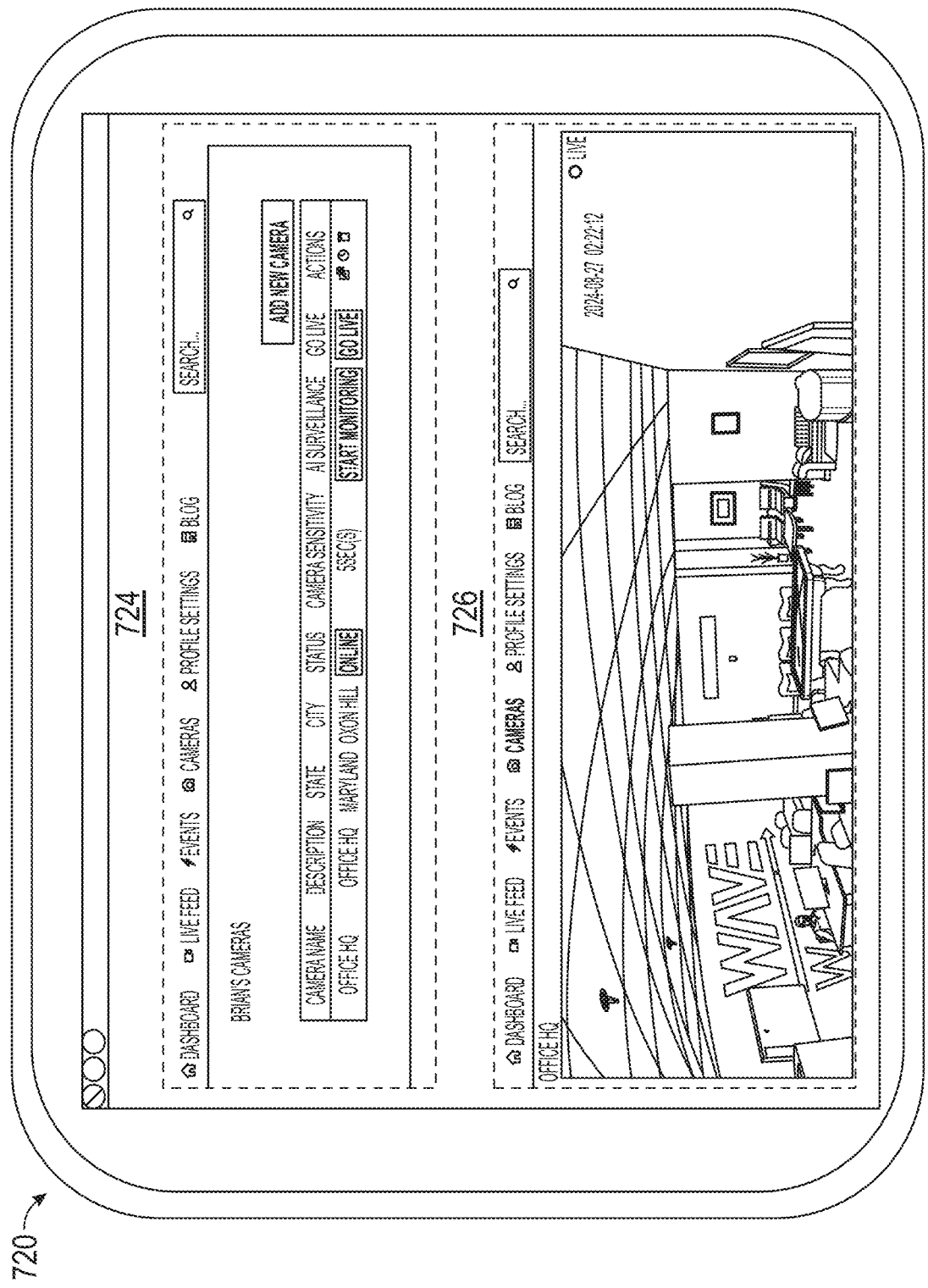

With further reference to FIG. 10, exemplary screens accessible through the customer portal 720 are shown. In the camera screen 724, an individual may view data related to connected cameras such as name, description, location (e.g., city, state), status (e.g., online, offline), sensitivity (e.g., time delay), AI surveillance (e.g., option to "start monitoring"), and/or live (e.g., option to "go live" and start streaming in real-time). An individual with authorized access may add cameras to the list within the camera screen 724. For example, either a customer or administrator may select "Add new camera" and enter the requisite information to establish a connection to the desired equipment, including name, state, city, RTSP IP address, and/or office name. In another example, a customer may select "start monitoring" and/or "go live" to activate a live monitoring feature for a camera (s). The live monitoring feature generally includes access to video streams, such as video stream 726. In video stream 726, various monitoring features may be available, including freeze frames, screenshots, speed changes (e.g., reverse, fast forward), 360 rotation, and manual markups (e.g., circling threat on screen). In aspects, markups made may be fed back through AI (e.g., anomalous behavior model 530 and/or machine learning network 320) in a feedback loop to reinforce learning regarding identification of potential threat 510.

Additional screens may be available through the customer portal 720. For example, as previously discussed, a ticketing screen may be available to open tickets related to potential threat 510, such as a request to continue to monitor potential threat 510 until an indication that an issue is neutralized. In aspects, an individual may manually enter a potential threat 510 via a GUI and/or ticket. A specific screen may be available for tracking and monitoring alerts. In aspects, a user (e.g., end user 560) may be alerted via GUI 700, a message (e.g., a short message service (SMS), multimedia messaging service (MMS), a rich communication service (RCS), instant message (IM), push notification, in-app message, or emergency alert), and/or an e-mail message. The alert may include information regarding the potential threat (e.g., identifying information such as approximated height, weight, ethnicity, and distinguishing facial features), photos, and/or videos, with a link to a live stream monitoring provided potential threat 510.

Figure 11:
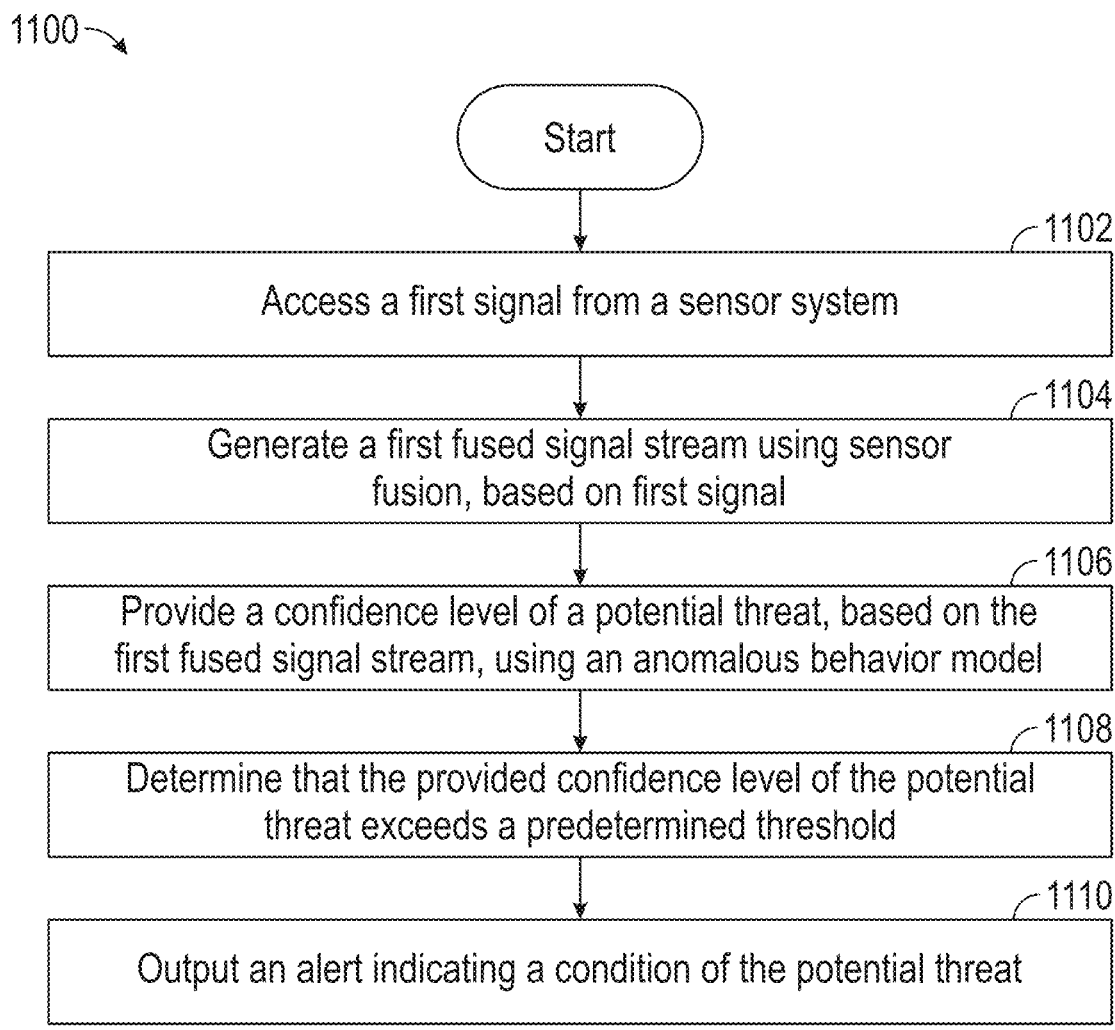
FIG. 11 is a flow diagram of an exemplary use of the systems of FIGS. 1 and 5, in accordance with aspects of the present disclosure.

FIG. 11 shows a method 1100 for an exemplary use of the detection system 500. Although the steps of method 1100 of FIG. 11 are shown in a particular order, the steps need not all be performed in the specified order, and certain steps can be performed in another order. For example, FIG. 11 will be described below, with a server (e.g., controller 200 of FIG. 2) performing the operations. In various aspects, the method 1100 of FIG. 11 may be performed all or in part by controller 200. In other aspects, the method 1100 of FIG. 11 may be performed all or in part by another device, for example, a mobile device and/or a client computer system. These and other variations are contemplated to be within the scope of the present disclosure.

Initially, at step 1102, the controller 200 causes detection system 500 to access a first signal from a first sensor system. Generally, the first signal includes an optical signal, an infrared signal, a radio detection and ranging (RADAR) signal, and/or a light detection and ranging (LIDAR) signal. For example, a visual surveillance camera (e.g., a visual sensor 610) of sensor system 600 may access signals, which represent an initial detection and/or visual representation of a potential active shooter in a sports arena. In another example, an individual (e.g., attendee at arena and/or end user 560) may visualize and/or be made aware of potential threat 510, and thereby manually enter data into detection system 500. The individual may enter data via GUI 700, for example, via a ticketing system within the customer portal 720. At this time, authorized users may receive an initial alert regarding potential threat 510, which may serve as a preemptive warning. Unmanned system 520 may be activated now, or after confirmation on the potential threat 510 is received.

Next, at step 1104, the controller 200 causes the detection system 500 to generate a fused data stream 640 based on the first signal. Typically, the data of the first signal is standardized into a uniform format for seamless processing. For example, a visual signal (e.g., electrooptical signal) from visual sensor 610 and an infrared signal (e.g., a heat signature) from infrared sensor 620 may be combined using sensor fusion to produce fused data stream 640, e.g., via feature extraction and fusion techniques.

In this example, the visual sensor 610 may capture 360 degrees of images (i.e., electrooptical (EO) images) in the visible spectrum, providing detailed color and texture information of the environment (e.g., stadium attendees, equipment, suspected individuals, and/or weapons), while the infrared sensor 620 may capture images in the infrared spectrum, detecting heat signatures and temperature variations, which are not visible to the human eye nor visual sensor 610.

Initially, the visual sensor 610 and the infrared sensor 620 may be calibrated relative to each other to match a particular view within the arena (e.g., field level view at 45-degree angle). If the visual sensor 610 and the infrared sensor 620 have different resolutions, they must also be resampled. For example, the visual sensor 610 may be a high-definition (HD) 1080p camera (e.g., 1920×1080 pixels), and the infrared sensor 620 may be a high-resolution IR camera (e.g., 640×480 pixels (VGA)). Thus, the resulting fused image may be resized to match the higher resolution image (e.g., IR image is up-sampled to match EO image), using resampling techniques such as nearest-neighbor interpolation bilinear interpolation, bicubic interpolation, and/or lanczos resampling.

Thereafter, both the IR image and EO image may be registered. For example, key points including building corners and/or other distinct features may be identified, and a transformation matrix may be calculated to align the IR image with the EO image spatially. An affine transformation may also be applied to the IR image to resolve differences in scale, rotation, and/or translation to ensure that corresponding points in the images match. Next, feature extraction may be utilized. For example, in the EO image, edges (e.g., building outlines, vehicle shapes), textures (e.g., road surfaces, grass), and/or color information (e.g., clothing colors, vehicle colors) may be extracted. In the IR image, key thermal features may be extracted, including hot spots corresponding to warm bodies (e.g., people or animals), engines of recently parked vehicles, and/or other heat sources.

Fusion techniques may involve data-level fusion (e.g., pixel-level fusion). For example, a weighted averaging technique may be used to combine the EO and IR images. The thermal data from the IR image may be overlaid onto the EO image, with warmer areas (e.g., body heat) highlighted. This helps to visualize heat-emitting objects in the context of the detailed color scene from the EO camera. The IR data may be color-coded using a heatmap (e.g., warmer areas in red/orange and cooler areas in blue/green) and overlaid semi-transparently onto the EO image. This allows a security team (e.g., operations system 540 and/or end user 560) to visualize both the thermal signatures and the normal visual scene together. Post-processing filters and/or sharpening may be used to better view certain areas of the fused data stream 640.

Next, at step 1106, the controller 200 may cause the detection system 500 to provide a confidence level of potential threat 510 using anomalous behavior model 530. Typically, the confidence level is based on a prediction gleaned from analysis of fused data stream 640. For example, fused data stream 640 may include a dataset containing fused EO and IR images and each fused image may include a binary label of 0 or 1 (e.g., 0 indicates no potential threat 510, whereas 1 indicates presence of a potential threat 510). In this example, anomalous behavior model 530 may be used, which can be a CNN with an input layer, which accepts a fused image as a tensor with dimensions corresponding to the image resolution and/or the number of channels.

Here, multiple convolutional layers may be applied to extract features from the fused image, e.g., to identify edges, textures, and/or patterns that correspond to potential threat 510. For example, with a firearm, features such as the distinct shape of a firearm (e.g., barrel, grip, and/or trigger guard to determine the overall outline), texture (e.g., metal or polymer surface), color/finish (e.g., black metallic or matte), components (e.g., barrel, grip, trigger), and/or additional features (e.g., scope, silencer, or markings) may aid in identification. Conversely, for a weapon such as a knife, features such as distinct shape of a blade, handle, tip, and/or hilt, texture (e.g., smooth, serrated), components (e.g., guard, bolster) may be noted. Features may be labeled using bounding boxes, segmentation masks, and/or annotations. After the fused images are processed, the CNN may output a confidence level between 0 and 100%, thereby denoting the presence of the potential threat 510. Machine learning network 320 may be utilized to further refine the confidence level and/or prediction(s) using additional training, e.g., data from unmanned system 520.

Next, at step 1108, the controller 200 may cause the detection system 500 to determine that the confidence level of the provided potential threat 510 exceeds a predetermined threshold. For example, detection system 500 may be preset to only alert a user when the confidence level exceeds 50%. The threshold may be set based on machine learning and/or set by a user, e.g., within GUI 700. In aspects, the threshold may be scalable and/or customized depending on the category of the potential threat 510. For example, more training data (e.g., photos and videos or firearms) may be available for predicting a firearm, a confidence level of >70% may be required, whereas a confidence level of only 55% may be required for a knife due to less training data available.

Next, at step 1110, the controller 200 may cause the detection system 500 to output an alert indicating a condition of the potential threat 510. For example, local law enforcement and/or arena patrons may be altered via emergency communications systems, and an end user 560 may be alerted. The alert may be an emergency SMS text, phone call, and/or push alert. In addition, unmanned system 520 may be alerted to provide more detailed, real-time monitoring. At this time, an individual may be able to monitor the threat via detection system 500, e.g., via GUI 700. The individual may press "threat neutralized," for example, if the armed shooter is detained by responding authorities.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran®, Java®, JavaScript®, machine code, operating system command languages, Pascal®, Perl®, PL1, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above are also intended to be within the scope of the disclosure.

What is claimed is:

1. A system for detecting a potential threat, comprising:
   a processor; and
   a memory coupled to the processor, the memory having instructions stored thereon, which when executed by the processor, cause the system to:
      access a first signal from a first sensor system, the first signal including at least two of an optical signal, an infrared signal, a radio detection and ranging (RADAR) signal, or a light detection and ranging (LIDAR) signal;
      generate a first fused signal stream, using sensor fusion, based on the first signal;
      provide a confidence level of the potential threat, based on the first fused signal stream, using an anomalous behavior model;
      determine that the provided confidence level of the potential threat exceeds a predetermined threshold; and
      output an alert indicating a condition of the potential threat.

2. The system of claim 1, wherein the potential threat includes an individual having at least one of a firearm, a knife, or an explosive device.

3. The system of claim 2, wherein providing the confidence level of the potential threat includes identifying an anomalous behavior of the individual, the anomalous behavior including at least one of patting, staring, or wandering by the individual.

4. The system of claim 1, wherein the instructions, when executed by the processor, further cause the system to:
   activate a second sensor system configured to detect a second signal, based on the output of the alert.

5. The system of claim 4, wherein the second sensor system includes at least one of an unmanned aerial vehicle (UAV), an unmanned ground vehicle (UGV), or a robotic surveillance system.

6. The system of claim 5, wherein the instructions, when executed by the processor, further cause the system to:
   receive the second signal from the second sensor system, the second signal including at least one of an optical signal, a global positioning system (GPS) signal, an infrared signal, a RADAR signal, or a LIDAR signal.

7. The system of claim 6, wherein the first signal is a real-time streaming protocol (RTSP) signal, and the second signal is a real-time messaging protocol (RTMP) signal.

8. The system of claim 7 wherein the instructions, when executed by the processor, further cause the system to:
   convert the second signal from a RTSP signal to a RTMP signal.

9. The system of claim 8, wherein the instructions, when executed by the processor, further cause the system to:
   generate a second fused signal stream, based on the first signal and the second signal; and
   refine the provided confidence level of the potential threat using a machine learning network, based on the second fused signal stream.

10. The system of claim 9, wherein the anomalous behavior model and the machine learning network include at least one of a convolutional neural network (CNN), a generative adversarial network (GAN), or a recurrent neural network (RNN).

11. A processor-implemented method for detecting a potential threat, the method comprising:
- accessing a first signal from a first sensor system, the first signal including at least two of an optical signal, an infrared signal, a radio detection and ranging (RADAR) signal, or a light detection and ranging (LIDAR) signal;
- generating a first fused signal stream, using sensor fusion, based on the first signal;
- providing a confidence level of a potential threat, based on the first fused signal stream, using an anomalous behavior model;
- determining that the provided confidence level of the potential threat exceeds a predetermined threshold; and
- outputting an alert indicating a condition of the potential threat.

12. The processor-implemented method of claim 11, wherein providing the potential threat includes identifying an individual having at least one of a firearm, a knife, or an explosive device.

13. The processor-implemented method of claim 12, wherein providing the confidence level of the potential threat includes identifying an anomalous behavior of the individual, the anomalous behavior including at least one of patting, staring, or wandering by the individual.

14. The processor-implemented method of claim 11, further comprising:
- activating a second sensor system configured to detect a second signal, based on outputting the alert.

15. The processor-implemented method of claim 14, wherein the second sensor system includes at least one of an unmanned aerial vehicle (UAV), an unmanned ground vehicle (UGV), or a robotic surveillance system.

16. The processor-implemented method of claim 15, further comprising:
- receiving the second signal from the second sensor system, the second signal including at least one of an optical signal, a global positioning system (GPS) signal, an infrared signal, a RADAR signal, or a LIDAR signal.

17. The processor-implemented method of claim 16, further comprising:
- converting the second signal from a RTSP signal to a RTMP signal, wherein the first signal is a real-time streaming protocol (RTSP) signal, and the second signal is a real-time messaging protocol (RTMP) signal.

18. The processor-implemented method of claim 17, further comprising:
- generating a second fused signal stream, based on the first signal and the second signal; and
- refining the provided confidence level of the potential threat using a machine learning network, based on the second fused signal stream.

19. The processor-implemented method of claim 18, wherein the anomalous behavior model and the machine learning network include at least one of a convolutional neural network (CNN), a generative adversarial network (GAN), or a recurrent neural network (RNN).

20. A non-transitory computer readable storage medium including instructions that, when executed by a computer, cause the computer to perform a method for detecting a potential threat, the method comprising:
- accessing a first signal from a first sensor system, the first signal including at least two of an optical signal, an infrared signal, a radio detection and ranging (RADAR) signal, or a light detection and ranging (LIDAR) signal;
- generating a first fused signal stream, using sensor fusion, based on the first signal;
- providing a confidence level of the potential threat, based on the first fused signal stream, using an anomalous behavior model;
- determining that the provided confidence level of the potential threat exceeds a predetermined threshold; and
- outputting an alert indicating a condition of the potential threat.

* * * * *